United States Patent
Kogan et al.

(10) Patent No.: US 10,572,490 B2
(45) Date of Patent: Feb. 25, 2020

(54) AUTOMATICALLY AUGMENTING MESSAGE EXCHANGE THREADS BASED ON TONE OF MESSAGE

(71) Applicant: Google Inc., Mountain View, CA (US)

(72) Inventors: David Kogan, Natick, MA (US); Wangqing Yuan, Wilmington, MA (US); Wei Chen, Belmont, MA (US); Bryan Horling, Belmont, MA (US); Michael Itz, Somerville, MA (US)

(73) Assignee: GOOGLE LLC, Mountain View, CA (US)

(*) Notice: Subject to any disclaimer, the term of this patent is extended or adjusted under 35 U.S.C. 154(b) by 899 days.

(21) Appl. No.: 15/157,372

(22) Filed: May 17, 2016

(65) Prior Publication Data

US 2017/0337199 A1 Nov. 23, 2017

(51) Int. Cl.
| | |
|---|---|
| *G06F 16/2457* | (2019.01) |
| *G06N 20/00* | (2019.01) |
| *G06F 17/24* | (2006.01) |
| *G10L 15/22* | (2006.01) |
| *H04L 12/58* | (2006.01) |
| *H04W 4/14* | (2009.01) |

(52) U.S. Cl.
CPC ...... *G06F 16/24578* (2019.01); *G06F 17/241* (2013.01); *G06N 20/00* (2019.01); *G10L 15/22* (2013.01); *H04L 51/02* (2013.01); *H04L 51/16* (2013.01); *H04W 4/14* (2013.01)

(58) Field of Classification Search
CPC ........... G06F 16/24578; G06F 16/3329; G06F 17/241; G06N 20/00; G10L 15/22; H04L 51/02; H04L 51/16; H04W 4/14
See application file for complete search history.

(56) References Cited

U.S. PATENT DOCUMENTS

| | | |
|---|---|---|
| 9,015,192 B1 | 4/2015 | Nachum et al. |
| 2012/0258742 A1 | 10/2012 | Kafka et al. |

(Continued)

OTHER PUBLICATIONS

The Intellectual Property Office of the United Kingdom; Combined Search Report under Section 17 (5)(b) and Abbreviated Examination Report under Section 18(3) of Application No. GB1620957.9 dated Mar 7, 2017.

(Continued)

*Primary Examiner* — Taelor Kim
(74) *Attorney, Agent, or Firm* — Middleton Reutlinger (57) ABSTRACT

Methods, apparatus, systems, and computer-readable media are provided for automatically augmenting message exchange threads based on a detected tone of messages exchanged between participants. In various implementations, a message contributed to a message exchange thread involving one or more message exchange clients by a participant may be determined. In various implementations, an idle chatter score associated with the message may be calculated. In various implementations, either a conversational response to the message or content responsive to a search query generated based on the message may be selectively incorporated into the message exchange thread based at least in part on the idle chatter score. In some implementations, a search query suitability score associated with the message may also be calculated.

18 Claims, 6 Drawing Sheets

(56) References Cited

U.S. PATENT DOCUMENTS

2015/0314454 A1 11/2015 Breazeal et al.
2017/0147942 A1* 5/2017 Gao ..................... G06N 7/005

OTHER PUBLICATIONS

International Search Report and Written Opinion of U.S. Appl. No. PCT/US16/67059 dated Feb. 7, 2017.
The Korean Intellectual Property Office; Office Action issued in Application No. 10-2018-7035191; dated Oct. 31, 2019.

* cited by examiner

AUTOMATICALLY AUGMENTING MESSAGE EXCHANGE THREADS BASED ON TONE OF MESSAGE

BACKGROUND

Personal assistant modules are software processes installed on computing devices such as smart phones, tablets, vehicle navigation systems, smart watches, as well as general purpose computing devices (e.g., desktops, laptops) to provide user-friendly interfaces for users to issue natural language commands. Users often issue natural language commands using their voices, but personal assistant modules may respond to other modalities as well, such as various forms of textual and/or image input. Users may communicate with personal assistant modules and/or each other textually via message exchange threads implemented using various technologies, such as text messaging, online chat (e.g., instant messenger, Internet relay chat, etc.), social network threads, interactive voice response, and so forth. The ongoing message exchange thread is typically limited to text (e.g., typed or generated from voice input) or other data such as pictures that users deliberately and explicitly incorporate into the message exchange thread.

SUMMARY

The present disclosure is generally directed to methods, apparatus, and computer-readable media (transitory and non-transitory) for automatically augmenting message exchange threads based on a detected tone of messages exchanged between participants. More particularly, techniques described herein relate to determining whether a message contributed to a message exchange thread by a participant (either directed to another participant or directed to a personal assistant module) is "chatty" or "searchy," and based on that determination, automatically and selectively incorporating a response that is either "chatty" or that conveys content responsive to a search query generated from the participant's message. More particularly, a message contributed to a message exchange thread by a participant may be assigned an "idle chatter score" and/or a "search query suitability score." Based on one or both scores, the message exchange thread may be automatically augmented, e.g., on behalf of a personal assistant module that participates in the message exchange thread.

In some implementations, a computer implemented method may be provided that includes the steps of: determining, from a message exchange thread involving one or more message exchange clients, a message contributed to the message exchange thread by a participant; calculating an idle chatter score associated with the message; and selectively incorporating into the message exchange thread, based at least in part on the idle chatter score, either a conversational response to the message or content responsive to a search query generated based on the message.

This method and other implementations of technology disclosed herein may each optionally include one or more of the following features.

In various implementations, the incorporating may include inserting the response into a transcript of the message exchange thread that is displayed in a graphical user interface of a message exchange client operating on a given client computing device. In various implementations, calculating the idle chatter score may include providing the message as input to a machine learning model, wherein the machine learning model provides, as output, the idle chatter score. In various implementations, the machine learning model may provide, as output, a search query suitability score associated with the message. In various implementations, the method may include: comparing the idle chatter score with the search query suitability score; and selecting, based on the comparing, for incorporation into the message exchange thread, the conversational response to the message or the content responsive to the search query generated based on the message.

In various implementations, the machine learning model may be trained on at least one positive training example. The at least one positive training example may include an instance in which one or more participants of a prior message exchange thread responded positively to incorporation of a conversational response to a prior message of the prior message exchange thread or incorporation of content responsive to a prior search query generated based on the prior message.

In various implementations, the method may further include calculating a search results score associated with the content responsive to the search query, wherein the incorporating is further based on the search results score. In various implementations, the search results score may be based at least in part presence of one or more surfaced search results that are responsive to the search query. In various implementations, the method may include calculating a search query suitability score associated with the message based at least in part on one or more known entities or entity types mentioned in the message.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
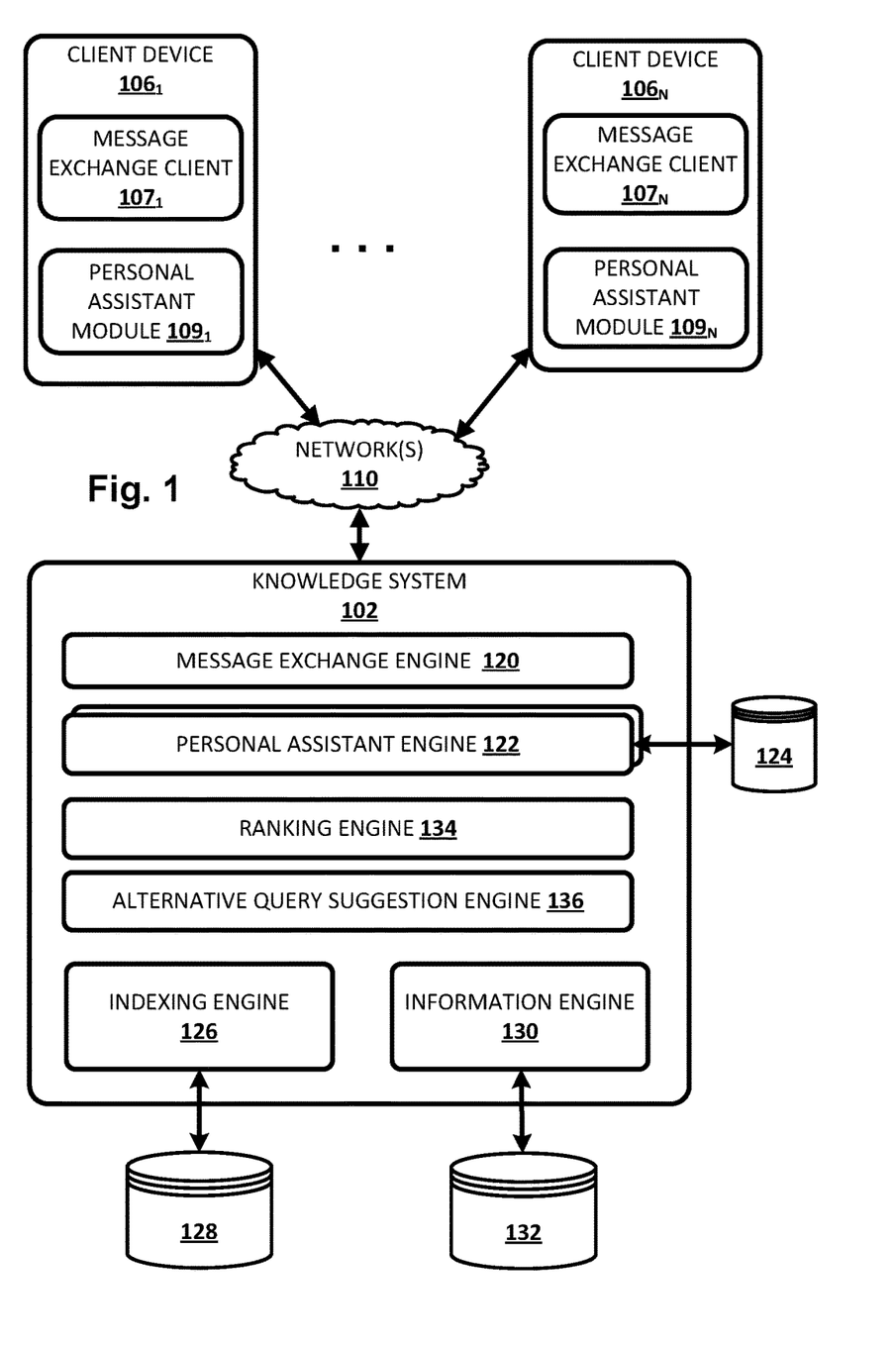
FIG. 1 illustrates an environment in which content may be automatically incorporated into a message exchange thread, in accordance with various implementations.

FIG. 1 illustrates an environment in which a message exchange thread may be automatically augmented with content based on a detected "tone" (e.g., idle chatter versus objective requests/questions) of messages exchanged between users. The example environment includes a plurality of client devices $106_{1-N}$ and a knowledge system 102. Knowledge system 102 may be implemented in one or more computers that communicate, for example, through a network. Knowledge system 102 is an example of an information retrieval system in which the systems, components, and techniques described herein may be implemented and/or with which systems, components, and techniques described herein may interface.

A user may interact with knowledge system 102 via a client device 106. Each client device 106 may be a computer coupled to the knowledge system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone voice command device, or a wearable apparatus of the user that includes a computing device (e.g., a watch of the user having a computing device, glasses of the user having a computing device). Additional and/or alternative client devices may be provided. A given user likely will operate a plurality of computing devices that collectively form a coordinated "ecosystem" of computing devices (which may or may not be owned by the user). However, for the sake of brevity, examples described in this disclosure will focus on the user operating a single client device 106.

Each client device 106 may operate a variety of different applications, such as a message exchange client 107 and/or a personal assistant module 109. Message exchange client 107 may come in various forms. In some implementations, message exchange client 107 may come in the form of a short messaging service ("SMS") and/or multimedia messaging service ("MMS") client, an online chat client (e.g., instant messenger, Internet relay chat, or "IRC," etc.), a messaging application associated with a social network, an interface used to communication with a personal assistant module, and so forth. In some implementations, message exchange client 107 may be implemented within a webpage rendered by a web browser (not depicted). In various instances, two client devices 106 operated by participants of a message exchange thread may run different message exchange clients 107 that nonetheless facilitate communication using a common communication protocol. For example, client device $106_1$ may have one SMS application distributed by one vendor installed, and client device $106_N$ may have another SMS application distributed by another vendor installed.

As described in the background, personal assistant module 109 may take the form of a software process installed on a given client computing device 106 to provide user-friendly interfaces for users to issue natural language commands. Personal assistant module 109 may be invoked or "awakened" by various stimuli, such as a user speaking one or more code words that are selected to activate personal assistant module 109. In various implementations described herein, a user may communicate with a personal assistant module 109 in a message exchange thread, e.g., using voice input, text input, and so forth. Further, personal assistant module 109 may participate in a message exchange thread that involves multiple message exchange clients 107 operating on multiple client devices 106 and controlled by multiple participants. For example, and as will be described in more detail below, personal assistant module 109 may automatically select and incorporate content into a message exchange thread in response to one or more messages contributed to the message exchange thread by one or more participants.

Each of client device 106 and knowledge system 102 may include one or more memories for storage of data and software applications, one or more processors for accessing data and executing applications, and other components that facilitate communication over a network. The operations performed by client device 106 and/or knowledge system 102 may be distributed across multiple computer systems. Knowledge system 102 may be implemented as, for example, computer programs running on one or more computers in one or more locations that are coupled to each other through a network.

In various implementations, knowledge system 102 may include a message exchange engine 120, a personal assistant engine 122, an indexing engine 126, an information engine 130, a ranking engine 134, and an alternative query suggestion engine 136. In some implementations one or more of engines 120, 122, 126, 130, 134, and/or 136 may be omitted. In some implementations all or aspects of one or more of engines 120, 122, 126, 130, 134, and/or 136 may be combined. In some implementations, one or more of engines 120, 122, 126, 130, 134, and/or 136 may be implemented in a component that is separate from knowledge system 102. In some implementations, one or more of engines 120, 122, 126, 130, 134, and/or 136, or any operative portion thereof, may be implemented in a component that is executed by client device 106.

In various implementations, message exchange engine 120 may be configured to facilitate a message exchange thread between multiple message exchange clients 107 operating on multiple client devices 106 controlled by multiple participants. For example, message exchange engine 120 may maintain a global "transcript" of messages and other content participants exchange with each other in a message exchange thread. As used herein, a "transcript" may refer to a live record of text, images, sounds, and/or applets exchanged and/or viewed by one or more participants in a message exchange thread. In some implementations, a transcript of a message exchange thread may be updated in real time or near real time as the participants converse. In scenarios in which a single participant communicates with personal assistant module 109, the transcript may be maintained locally by personal assistant module 109 and/or remotely by personal assistant engine 122.

In various implementations, personal assistant engine 122 may include complementary functionality for handling voice input, e.g., using a voice-based query processor that relies on various online acoustic/language, grammar and/or action models that may be stored in index 124. It will be appreciated that in some implementations, particularly as most client devices 106 are resource-constrained devices, personal assistant engine 122 may implement more complex and computational resource-intensive voice processing functionality than is local to each client device 106. It should be further understood that when an action is described herein as being performed by personal assistant module 109, that may or may not also include one or more aspects of the action being performed by personal assistant engine 122.

In some implementations, multiple personal assistant engines 122 may be employed, each acting as an online counterpart for one or more individual personal assistant modules 109. For example, in some implementations, each client device 106 in a user's ecosystem may be configured to operate an instance of a personal assistant module 109 that is associated with the user (e.g., configured with the user's preferences, associated with the same interaction history, etc.). A single, user-centric online instance of personal assistant engine 122 may be accessible to each of these multiple instances of personal assistant module 109, depending on which device the user is operating at the time.

In some implementations, both online and offline functionality may be supported, e.g., such that online functionality is used whenever a client device 106 is in communication with an online service, while offline functionality is used when no connectivity exists. In other implementations different actions or action domains may be allocated to online and offline functionality, and while in still other implementations, online functionality may be used only when offline functionality fails to adequately handle a particular voice input. In other implementations, however, no complementary online functionality may be used.

Indexing engine 126 may maintain an index 128 for use by knowledge system 102. The indexing engine 126 processes documents and updates index entries in the index 128, for example, using conventional and/or other indexing techniques. For example, the indexing engine 126 may crawl one or more resources such as the World Wide Web and index documents accessed via such crawling. As another example, the indexing engine 126 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Information engine 130 may maintain another index 132 that includes or facilitates access to non-document-specific information for use by the knowledge system 102. For example, knowledge system 102 may be configured to return information in response to search queries that appear to seek specific information. If a user searches for "Ronald Reagan's birthday," knowledge system 102 may receive, e.g., from information engine 130, the date, "February 6, 1911." This information may be returned to the user as a part of search results that is separate from documents received from indexing engine 126. In various implementations, index 132 itself may contain information, or it may link to one or more other sources of information, such as online encyclopedias, almanacs, and so forth. In various implementations, index 128 or index 132 may include mappings between queries (or query terms) and documents and/or information.

In this specification, the term "database" and "index" will be used broadly to refer to any collection of data. The data of the database and/or the index does not need to be structured in any particular way and it can be stored on storage devices in one or more geographic locations. Thus, for example, the indices 124, 128, and 132 may include multiple collections of data, each of which may be organized and accessed differently.

Ranking engine 134 may use the indices 128 and/or 132 to identify documents and other information responsive to a search query, for example, using conventional and/or other information retrieval techniques. Ranking engine 134 may calculate scores for the documents and other information identified as responsive to a search query, for example, using one or more ranking signals. Each ranking signal may provide information about the document or information itself, the relationship between the document or information and the search query, and/or the relationship between the document or information and the user performing the search.

Alternative query suggestion engine 136 may use one or more signals and/or other information, such as a database of alternative query suggestions (not depicted) and/or information about a user of client device 106 (e.g., search history, GPS location, user attributes), to generate alternative query suggestions to provide to client device 106 along with any search results. As a user types consecutive characters of the search query, alternative query suggestion engine 136 may identify alternative queries that may be likely to yield results that are useful to the user. For instance, assume the client device 106 is located in Chicago, and has typed the characters, "restaur." Alternative query suggestion engine 136 may, based on a location signal indicating that the client device 106 is in Chicago and a search history signal indicating a user's preference for restaurants with live music, suggest a query, "restaurants in Chicago with live music." As another example, for a user who has typed "Ronald Reagan's birt," alternative query suggestion engine 136 may, e.g., using techniques such as prefix matching, determine and suggest alternative queries such as "Ronald Reagan's birthday," "Ronald Reagan's birthplace," "Ronald Reagan's birth control position," and so forth. Alternative query suggestion engine 136 may provide other suggestions as well, such as spelling-corrected versions of a partially-formed search query.

In various implementations, an online component such as message exchange engine 120 or personal assistant engine 122, or even a component local to a client device 106, such as an individual message exchange client 107 or personal assistant module 109, may be configured to determine, from a message exchange thread involving one or more message exchange clients 107, a message contributed to the message exchange thread by a participant. An "idle chatter score," or "ICS," associated with the message may then be calculated. Based at least in part on the idle chatter score, either a conversational response to the message, or content responsive to a search query generated based on the message, may then be selectively incorporated into the message exchange thread.

Messages with relatively high idle chatter scores (i.e. "chatty" messages) may be messages—directed by a participant to personal assistant module 109 and/or to another participant—that comprise idle chit chat, informal and/or trivial conversation, so-called "small talk," subjective inquiries, etc. Such messages may not be well-suited for generation of a search query because content responsive to such a search query may not be particularly helpful if incorporated into a message exchange thread, e.g., because the responsive content may not be particularly well-focused, meaningful, and/or may not be particularly pertinent to a tone of the conversation taking place on the message exchange thread. Put another way, a message with a relatively high idle chatter score may not be indicative of an intent (explicit or implicit) by the participant to obtain outside/objective information with which to augment a message exchange thread. A message may be assigned a relatively high idle chatter score where, for instance, a participant says, to a personal assistant module or another participant in a message exchange thread, something like, "Hi," "How are you?", "What do you think about Obama?", "What is your favorite color?", and so forth.

As noted above, participants may direct messages having relatively high idle chatter scores at a personal assistant module 109 or to another participant. In various implementations, when such a message is directed to personal assistant module 109, a so-called "conversational response" may be identified and incorporated into the message exchange thread, e.g., by personal assistant module 109 and/or message exchange engine 120. In some implementations, an idle chatter score associated with a message may be calculated by matching the message to a plurality of candidate message/conversational response pairs, e.g., using "fuzzy" searching. Each matching pair may be assigned a score based on how well the message matches the candidate message/conversational response pair. The idle chatter score may then be determined from the candidate message/conversational response pair that best matches the message, e.g., with the highest score. And if the idle chatter score satisfies one or more thresholds, or as described below, exceeds a search query suitability score by an amount (Δ) that satisfies one or more thresholds, then the conversational response from the best matching message/conversational response pair may be incorporated into the message exchange thread, e.g., by personal assistant module 109.

Messages having relatively high ICS may also be directed by one participant in a message exchange thread to another participant, rather than to personal assistant module 109. In some implementations, similar analysis as described above may occur. However, instead of incorporating a conversational response into the message exchange thread directly, the other participant may be presented with one or more graphical elements (e.g., rendered buttons) that the other participant may select to cause a scripted auto-response to be incorporated into the message exchange thread. In other implementations, high ICS messages between participants, rather than between a participant and a personal assistant module, may simply be ignored.

In contrast to messages with relatively high idle chatter scores, messages with relatively high search query suitability scores may be more suitable for generation and submission of a search query. Content responsive to one or more search queries generated from such as message may be well-suited for incorporation into a message exchange thread, e.g., because it may be well-focused and/or is relatively likely to be pertinent to the tone of the conversation taking place over the message exchange thread. Examples of messages that may be assigned relatively high search query suitability scores may include messages that seek (or are at least relatable to) objective information, such as "Who is Barack Obama?", "What is the capital of Maine?", "I wonder who Tom Brady is married to?", "Who stars in that new film"?, and so forth.

In some implementations, one or more machine learning models may be trained to receive one or more participant messages as input and output an idle chatter score and/or a search query suitability score. Based on these scores, various content may be selectively incorporated into a message exchange thread, e.g., for display in a transcript rendered by one or more message exchange clients operated by a participant in the thread, or to be audibly output, e.g., by a standalone voice command device. In some implementations, if the idle chatter score is sufficiently greater than the suitability for search query score, and/or if the idle chatter score satisfies a predetermined threshold, then a conversational response associated with a message/conversational response pair that best matches the message may be incorporated into the thread. For instance, if the user says "Hello," the conversational response may be "hi" or "hello to you." Otherwise, content responsive to a search query generated based on the message may be incorporated into the message exchange thread.

In some implementations, one or more machine learning models may be trained using a corpus of messages obtained from one or more prior message exchange threads. For example, one or more previous instances of participant messages triggering incorporation of content into a message exchange thread may be analyzed. A negative training example may include an instance in which content was incorporated into a message exchange thread, e.g., on behalf of a personal assistant module, but that content was rejected (or at least ignored) by one or more participants (e.g., as detected by the participant(s) abruptly changing the subject). A positive training example may be an instance in which the participants respond positively to the incorporated content, e.g., by steering subsequent conversation in a similar direction and/or asking follow-up questions. In some implementations, only positive training examples and/or only negative training examples may be used to train the one or more machine learning models.

In addition to or instead of inputting the message(s) directly into one or more machine learning models as input, in various implementations, various permutations of terms (or tokens) of the message(s) may be used as input. In some implementations, for instance, one or more pairs of terms/tokens may be provided to one or more machine learning models as input. In some implementations, one or more groups of terms (e.g., in a class) may be provided as input. In other implementations, a natural language processor or other similar component may annotate the message in various ways (e.g., parts of speech, entity resolution, etc.), and those annotations may be used as input for one or more machine learning models.

Beside attributes of the message itself, other signals may be considered when calculating idle chatter and suitability for search query scores. In some implementations, one or contextual signals about a participant, such as their location, local time, etc., may be considered. For example, a particular message may be assigned a higher idle chatter score in a first country and a higher search query suitability score in a second country. If the participant is located in the first country when the participant contributes the message to the message exchange thread, the message may receive a higher idle chatter score than if the participant had been in the second country.

In some implementations, characteristics of content that is responsive to a search query generated using a message may be considered when calculating a search query suitability score. For example, some content responsive to a particular search query generated from a message may include one or more so-called "surfaced" features that are displayed prominently (e.g., at the top of) a search engine results page ("SERP"). Surfaced content may include a direct answer to a search query (which may or may not be displayed above organic search results, e.g., in a box), navigational search results, paid search results, and so forth. A message that yields one or more surfaced features when submitted as one or more search queries may receive a relatively high search query suitability score. By contrast, if responsive content is unfocused and/or not pertinent to the tone of the message exchange thread, that may diminish the search query suitability score. In some implementations, a high search query suitability score may impact a idle chatter score, and vice versa. For example, if content responsive to a search query generated from a message is particularly focused, popular, and/or pertinent to the tone of the message exchange thread, that may decrease the likelihood that the message was merely idle chatter.

In scenarios in which a message's search query suitability score satisfies a threshold, or a difference between the message's search query suitability score and its idle chatter score is sufficiently great, one or more search queries may be generated, e.g., by message exchange engine 120, personal assistant engine 122, a message exchange client 107, a personal assistant module 109, etc., and submitted to various components of knowledge system 102. Content such as documents and information that are responsive to the one or more search queries may be obtained from these same various components, including but not limited to from indexing engine 126 and/or information engine 130. In various implementations, content responsive to the one or more search queries may further include alternative query suggestions returned from alternative query suggestion engine 136. In some implementations, content responsive to the one or more search queries may be ranked by ranking engine 134 prior to it being returned.

Based on the responsive content, various items associated with the responsive content, such as graphical elements (words, images, animations, applets), sounds, etc., may be incorporated into a message exchange thread between two or more users operating two or more message exchange clients 107. In implementations where a transcript of the message exchange thread is visible to one or more participants (e.g., a respective graphical user interface), the incorporated items may be viewable by the one or more of the users. In purely audible/voice response implementations, by contrast, the responsive content may be delivered to a participant audibly.

Items may be incorporated into a message exchange thread between multiple message exchange clients 107 in a variety of ways. In some implementations, message exchange engine 120, personal assistant engine 122, and/or personal assistant module 109 may request that at least one message exchange client 107 participating in the message exchange thread insert one or more graphical elements associated with the responsive content into a transcript of the ongoing message exchange thread that is displayed in a graphical user interface. In some scenarios, the graphical elements may be incorporated into transcripts rendered by more than one message exchange client 107, such as in transcripts rendered by all message exchange clients 107 participating in the message exchange thread. In some implementations, responsive content may simply be provided to each message exchange client 107, which may then select what content to incorporate into its version of the transcript of the message exchange thread. Or, as noted above, any one of components 120, 122, 107, and/or 109 may audibly incorporate items into an audible message exchange thread.

Various types of graphical elements may be incorporated into the rendered transcript of the message exchange thread. In some implementations, the one or more graphical elements may include text that conveys information that is responsive to the search query formed by message exchange engine 120. Suppose a first participant operates her message exchange client 107 to pose a question, to another participant or to personal assistant module 109, "What was the first state admitted into the union?" Message exchange engine 120, personal assistant module 109, personal assistant engine 122, or another component may, at the request of a user or sua sponte, submit the question (or a variation thereof) to indexing engine 126 and/or information engine 130 as a search query. Indexing engine 126 and/or information engine 130 may provide information responsive to the search query, such as an indication that Delaware was the first state that was admitted into the United States of America. Additional responsive information may be included as well, such as the date Delaware was admitted, what state was admitted after, etc. Some or all of this information may then be incorporated into the message exchange thread, so that it is incorporated into a transcript displayed in the graphical user interface of, for instance, the message exchange client 107 operated by the user that posed the question.

In addition to or instead of text, in various implementations, the one or more graphical elements that are incorporated into the message exchange thread may include one or more images that convey the content responsive to the search query. In the above-described scenario, for instance, an image of the state of Delaware and/or its flag may be incorporated into the message exchange thread in addition to or instead of text about Delaware.

In many instances, the information responsive to the search query may be too unwieldy (e.g., too long, too much detail, etc.) to feasibly incorporate into the message exchange thread without disrupting the flow of the conversation. In such situations, a subset of the total responsive information may be selected (i.e., the total responsive information may be culled) for incorporation into the thread. In some implementations, message exchange engine 120, personal assistant engine 122, and/or personal assistant module 109 may select the subset (or cull the responsive information) for incorporation into the message exchange thread. In other implementations, the comprehensive responsive information may be provided to a message exchange client 107, and the message exchange client 107 may perform the culling. In some implementations, the information may be culled based on a screen size of the host client device 106. In some implementations, the top N search results may be selected for incorporation into the message exchange thread. N may be selected based on, for instance, screen size, user preferences, etc., or may be manually selected (e.g., N could be set to five, ten, two, one, etc.)

In some implementations, knowledge system 102 may have, e.g., as part of information engine 130 and/or another component, a so-called "knowledge base" that contains records of known entities (e.g., people, places, things), attributes of the known entities (e.g., type, name, age, location, etc.), and relationships between the known entities. In some implementations, such a knowledge base may be implemented, e.g., in index 132, as a graph in which nodes represent entities (and associated attributes in some cases) and edges represent relationships between entities, although this is not required. In some such implementations, information about entities from such a knowledge base may be made available to message exchange engine 120, e.g., in response to a search query formed and submitted by, e.g., message exchange engine 120 as described above.

In some implementations, the knowledge base may be used, e.g., by message exchange engine 120, personal assistant engine 122, and/or information engine 130, to identify a first entity or type of entity mentioned in the one or more messages exchanged between the two or more users as part of the message exchange thread. Information responsive to a search query related to the entity or entity type may then be incorporated into the message exchange thread. For example, suppose a user submits into the message exchange thread a message such as "Babe Ruth was the greatest!"

"Babe Ruth" may be identified, e.g., by information engine 130 based on a knowledge base stored in index 132, along with one or more attributes of Babe Ruth, and/or one or more related entities, such as one or more teams he played for (e.g., the New York Yankees), his family members, his teammates, years active, years alive, and so forth. One or more pieces of this information may then be selected and automatically incorporated (e.g., as one or more graphical elements) into the message exchange thread, e.g., by message exchange engine 120 or personal assistant engine 122, or locally at a client device 106 by a message exchange client 107 or personal assistant module 109. For example, when Babe Ruth is mentioned by a user in a message exchange thread, information about Babe Ruth and/or other baseball players may also be incorporated into the thread so that it is consumable by at least one user via a user interface of her message exchange client 107.

In various implementations, a multi-level, nested machine learning model (or more specifically, classifier) may be trained to distinguish between idle chatter and search query suitability. A broad set of training data from sources such as prior searches and message exchange threads may be used to train a first level of unsupervised machine learning models (or classifiers), such as 242/244 in FIG. 2. Output from these machine learning models, along with other signals such as search results and annotated queries, may be used to build a supervised machine learning model (or classifier). The supervised machine learning model may be triggered, e.g., each time a participant contributes a message to a message exchange thread, to produce an idle chatter score ("ICS") and search query suitability score ("SQSS"). Based on these scores, the input message may be grouped into one or more of several stratified levels of confidence. A ranking function may then utilize the ICS/SQSS, along with other signals from various sources of content responsive to a search query, to select a response that is most appropriate for incorporation into a message exchange thread.

Figure 2:
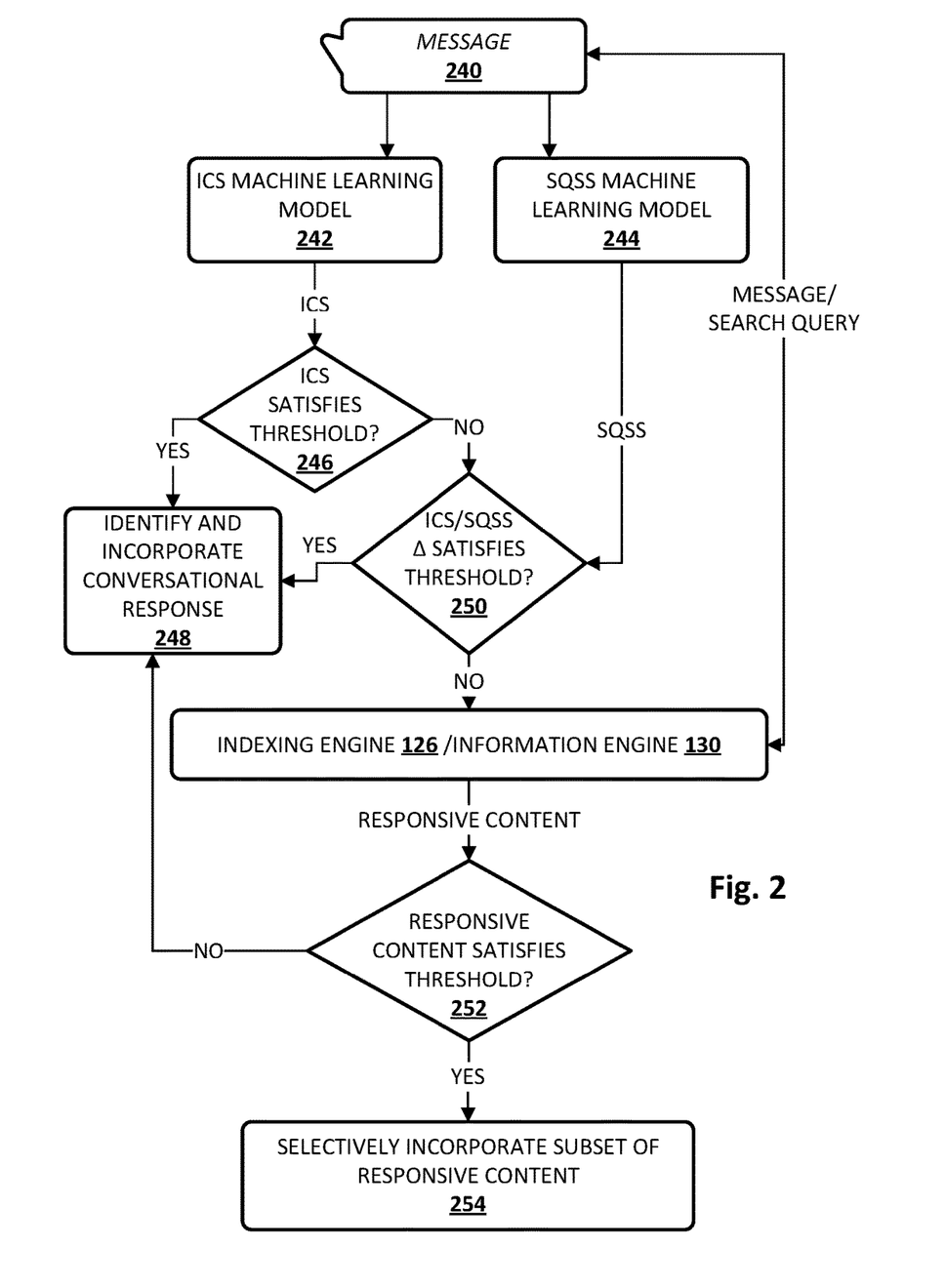
FIG. 2 depicts an example process flow associated with disclosed techniques, in accordance with various implementations.

FIG. 2 depicts one non-limiting example process flow that may be used by some implementations of the present disclosure. In this example, a message 240 identified from a message exchange thread may be used to provide input to one or more machine learning models, such as an ICS machine learning model 242 and a SQSS machine learning model 244. ICS machine learning model 242 outputs an ICS computed based on one or more attributes of message 240. SQSS machine learning model 244 outputs an SQSS computed based on one or more attributes of message 240. In some implementations, message 240 may be used as input verbatim to one or more both machine learning models. In other implementations, one or more attributes of message 240 (e.g., annotations, accompanying signals, etc.) may be used, in addition to or instead of message 240 itself, as input for one or both machine learning models. While machine learning models 242 and 244 are depicted separately, this is not meant to be limiting. In some implementations, a single machine learning model may receive the message 240 as input and provide both the ICS and SQSS.

In some implementations, ICS machine learning model 242 may be trained on one or more corpuses of message exchange thread messages that are known to comprise idle chit chat, and as such may serve as positive training examples. In some implementations, ICS machine learning model 242 may be trained with negative training examples as well, such as message exchange thread messages known to be suitable for search query generation and use. In other implementations, the ICS may be determined using techniques other than machine learning models. For example, in some implementations, message 240 may be compared to a plurality of message/conversational response pairs to determine a best match, e.g., using fuzzy search techniques. The more similar message 240 is to one or more message/conversational response pairs, the higher ICS may be assigned to that message.

In some implementations, SQSS machine learning model 244 may be trained on one or more corpuses of message exchange thread messages that are known to be suitable for generation and submission of search queries, and thus may serve as positive training examples. In some implementations, SQSS machine learning model 244 may be trained with negative training examples as well, such as message exchange thread messages known to constitute idle chatter. In some implementations, SQSS machine learning model 244 may be trained using a corpus of past search queries, which may or may not be related to past message exchange threads. Past search queries that yielded especially focused or strong responsive content may be used as positive training examples. Past search queries that yielded unfocused, nonsensical, or meaningless responsive content may be used as negative training examples.

In some implementations, the ICS output by ICS machine learning model 242 may be compared to one or more absolute thresholds at 246. If these absolute thresholds are satisfied, then the best matching conversational response may be incorporated into the message exchange thread at block 248. In some implementations, as part of the operations of 248, message 240 may be compared to a plurality of message/conversational response pairs to determine a best match, e.g., using fuzzy search techniques. Rather that computing the ICS of message 240 based on the closest match, if message 240 is exactly or nearly exactly matches a message/conversational response pair, the conversational response from the message/conversational response pair may be identified and incorporated into the message exchange thread from which message 240 originated. However, if the ICS does not satisfy the one or more thresholds at 246, then a difference (Δ) between the ICS and the SQSS output by SQSS machine learning model 244 may be determined at 250. If the difference between the ICS and the SQSS satisfies one or more thresholds, then the conversational response may be identified and incorporated into the message exchange thread back at 248.

If the answer at block 250 is no, then message 240 and/or one or more attributes of message 240 (e.g., annotations, term pairs, etc.), or a search query generated based on message 240, may be provided to various components of knowledge system 102, such as indexing engine 126 and/or information engine 130. Those components may produce responsive content (e.g., search results, alternative query suggestions, responsive information, etc.) that is then analyzed at block 252 to determine whether it satisfies one or more thresholds. If the answer is no, then the best matching conversational response may be identified and incorporated as described above with reference to 248. For instance, if the popularities of search results that are responsive to the search query are too low, then it may not be particularly helpful or interesting to the message exchange thread participants to incorporate indicative of these search results into the message exchange thread. If the answer at block 252 is yes, however, then a subset of the responsive content may be incorporated into the message exchange thread at 254.

The operations/components depicted in FIG. 2 are just one example of how disclosed techniques may be implemented. Numerous variations are contemplated herein. For example, in some implementations, ICS machine learning model 242 may be omitted. Instead, message 240 may simply be compared to a plurality of message/conversational response pairs to determine a best match. A similarity between message 240 and the message of the best matching message/conversational response pair may simply be used as the ICS. If the ICS satisfies one or more absolute thresholds (246), the conversational response may be incorporated into the message exchange thread without further analysis. The conversational response may also be incorporated into the message exchange thread if a difference (Δ) between the ICS and SQSS satisfies one or more thresholds (250), or if content responsive to a search query generated based on message 240 fails to satisfy one or more thresholds (252). Additionally or alternatively, rather than fuzzy matching, a series of heuristics may be provided to identify and incorporate a conversational response to message 240.

Figure 3:
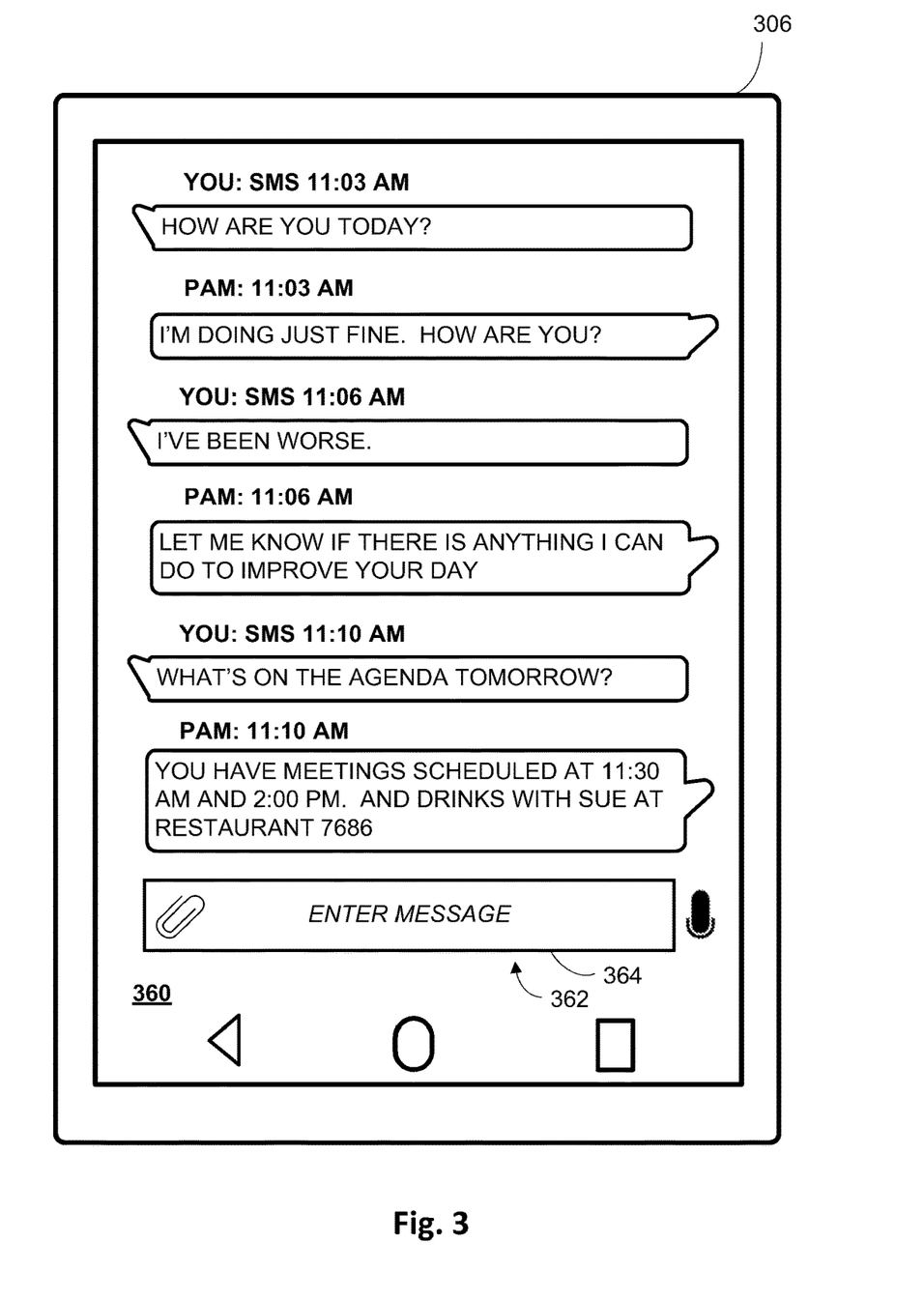
FIG. 3 and FIG. 4 depict how example graphical user interfaces may be affected when disclosed techniques are practiced, in accordance with various implementations.

FIG. 3 an example client device 306 operated by a particular user (designated "YOU") that includes a graphical user interface 360 associated with a message exchange client (not depicted specifically in FIG. 3) that operates on client device 306. Graphical user interface 360 displays a transcript 362 of a message exchange thread between the user operating client device 306 and a personal assistant module ("PAM") installed on client device 306. Graphical user interface 360 also includes a text input field 364 that the operator of client device 306 can use to input text or other content into the message exchange thread, e.g., in response to previous statements by the personal assistant module.

The operator first asks the personal assistant module, "How are you today?" This question (or more generally, "message") would not be suitable for use as a search query because the search results it might generate likely will not be very useful or meaningful. However, the question likely exactly or at least very closely matches one or more message/conversational response pairs, such as the following message/conversational response pair: <"How's it going today?", "I'm doing just fine. How are you?">. Consequently, the personal assistant module contributes the conversational response, "I'm doing just fine. How are you?" into the transcript 362. The operator of client device 306 next responds, "I've been worse." Once again, this message is not suitable for generation and submission of a search query. Instead, the message more likely matches one or more message/conversational response pairs, such as the following: <"I could be worse," "Let me know if there is anything I can do to improve your day">. Consequently, the personal assistant module contributes the conversational response, "Let me know if there is anything I can do to improve your day."

Next, the operator asks the personal assistant module, "What's on the agenda tomorrow?" The message "What's on the agenda tomorrow?" may, when used as input for a machine learning model such as those depicted in FIG. 2, yield a relatively low ICS and/or a relatively high SQSS. Additionally or alternatively, the fact that the message begins with the word "What" and includes the word "agenda" may also lead (e.g., via one or more heuristics) to this message being identified as suitable for use in generation and submission of a search query. Consequently, the message is used to generate and submit, e.g., to various components of knowledge system 102 or individual client devices 106, a search query that obtains the operator's schedule for the day after the current day. The personal assistant module then incorporates, into transcript in prose form, the response, "You have meetings scheduled at 11:30 AM and 2:00 PM. And drinks with Sue at Restaurant 7686."

Figure 4:
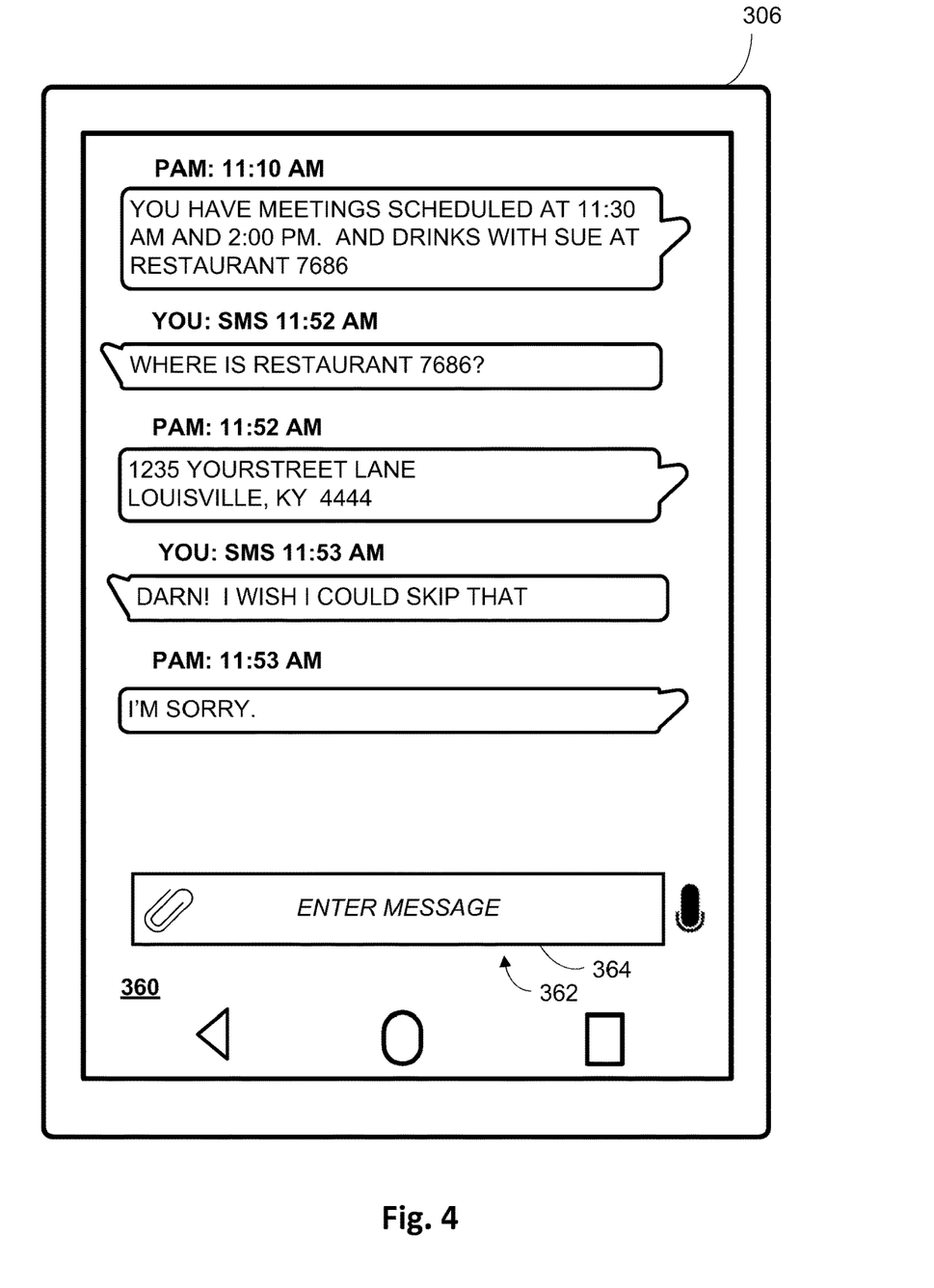

FIG. 4 depicts a continuation of the message exchange thread depicted in FIG. 3. Accordingly, all the components are the same other than the messages of transcript 362 that are visible in user interface 360. Following the personal assistant module's last message about the operator's schedule tomorrow (which was described above), the operator asks, "Where is Restaurant 7686?" Such a message may yield a relatively high SQSS and a relatively low ICS when, for instance, it is provided as input to one or more machine learning models (e.g., 242, 244). Additionally or alternatively, in some implementations, the entity "Restaurant 7686" may be cross referenced against the knowledge base described above to determine that Restaurant 7686 is a known entity. In general, identification of an entity mentioned in a message in a knowledge base may cause the originating message to receive a higher SQSS than it would otherwise. Thus, the user's question about Restaurant 7686 may receive a relatively high SQSS.

In some implementations, identification of an entity in the knowledge base may elevate the SQSS further if the entity is determined to be something that cannot be associated with a personal assistant module. For example, suppose a message exchange thread participant poses the question, "Where is your epiglottis?" The personal assistant module may determine from the knowledge base that an epiglottis is a human organ that it cannot possibly possess. Accordingly, a relatively high SQSS may be assigned to the participant's question. Content responsive to a corresponding search query, such as information about the epiglottis, may be incorporated into the message exchange thread, e.g., by the personal assistant module.

Back at FIG. 4, the personal assistant responds by providing an address for the Restaurant. The operator then exclaims, "Darn! I wish I could skip that." When provided as input to one or more machine learning models such as those depicted in FIG. 2, this message may receive a relatively high ICS and/or a relatively low SQSS. Consequently, the personal assistant may match this message as best as possible to a message/conversational response pair. For example, it may be matched to various degrees to the following message/conversational response pairs: <"Shoot!.*", "I'm sorry">, <"Dang!.*", "I'm sorry">, <"Drat!.*", "I'm sorry">. Consequently, in this example, the personal assistant module responds with the conversational response of "I'm sorry."

While the example of FIGS. 3-4 is shown as being implemented as part of a visual-based message exchange thread, this is not meant to be limiting. In various embodiments, techniques described herein may be applied to audible message exchange threads, e.g., between a participant and a personal assistant module operating on a stand-alone voice response device.

In examples described herein, data responsive to search queries formed based on message exchange thread contents has been obtained from the various sources associated with knowledge system 102 in FIG. 1. However, this is not meant to be limiting. Responsive data may be pulled from other sources as well. In some instances, search queries may be used to search information that is personal to a user (assuming the user provides permission first). For example, a user's own emails, texts, calendar entries, social network status updates, and other similar information that may be stored at least in part on client device 106, may be used as potentially searchable sources for which search queries may be used to search.

Figure 5:
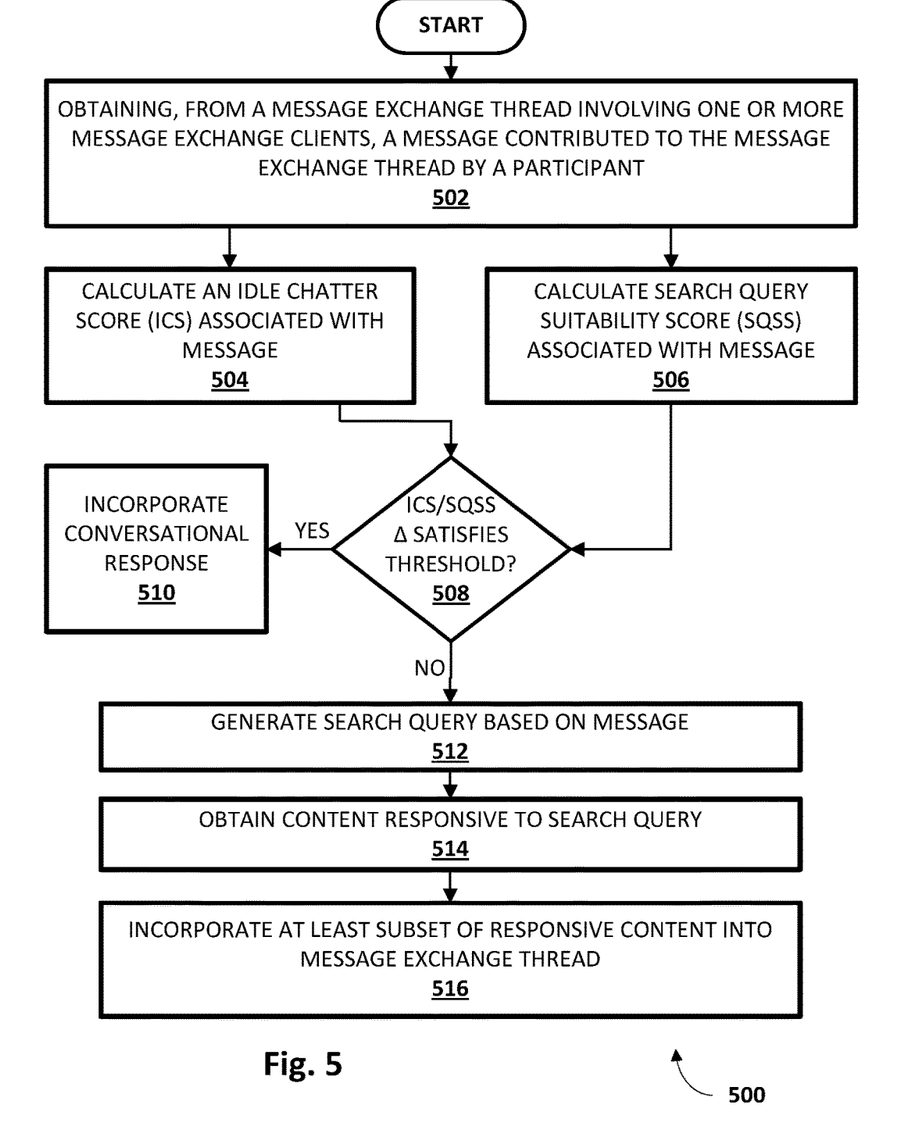
FIG. 5 depicts a flow chart illustrating an example method of augmenting an ongoing message exchange with content, in accordance with various implementations.

Referring now to FIG. 5, one example method 500 of augmenting a message exchange thread is described. For convenience, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system may obtain, from a message exchange thread involving one or more message exchange clients (and hence, one or more participants), a message contributed to the message exchange thread by a participant. This may include any message input into a message exchange thread by a participant, whether the message is directed to another participant or to a personal assistant module participating in the message exchange thread. For example, for purposes of illustration of method 500, suppose a user poses the question, "How old is President Obama?"

At block 504, an ICS associated with the message may be calculated. As noted above, in some implementations, the ICS may be provided by a machine learning model (e.g., 242) that received the message as input. Additionally or alternatively, in some implementations, the ICS may be calculated based on how well the message under consideration matches a message/conversational response pair. In the ongoing illustration, the message "How old is President Obama" may best match a message/conversational response pair of <"How old are you?", "I am [insert number of years since personal assistant module activated] years old">. Such a match would not likely yield a particularly high ICS.

At block 506, which may occur in some implementations in parallel with the operations of block 504, a SQSS associated with the message may be calculated. As noted above, in some implementations, the SQSS may be provided by a machine learning model (e.g., 244) that received the message as input. In the ongoing illustration, the message "How old is President Obama" may receive a relatively high SQSS because, for instance, it mentions a known entity and/or is a question about a third person. In alternative implementations, the SQSS may be generated based on content responsive to one or more search queries automatically generated based on the message and submitted to various sources. However, in the implementation of FIG. 5, the search query is generated at block 512 and submitted at block 514.

At block 508, the ICS calculated at block 504 may be compared to the SQSS calculated at block 506. If a Δ between the two values satisfies some predetermined threshold, then the system may proceed to block 510, at which point a conversational response associated with a message/conversational response pair that best matched the message under consideration may be incorporated into the message exchange thread. If the answer at block 508 is no, however, then method 500 may proceed to block 512. In the ongoing example, the ICS associated with the message "How old is President Obama" will likely be less than its SQSS, and so method 500 may proceed to block 512.

At block 512, the system may generate a search query based on the message under consideration. If the message is posed as a question or otherwise already is in the form of a usable search query, then the message may simply be submitted to various components verbatim as a search query. However, if the message is not in suitable form to be used as a search query, various natural language processing techniques, statement rewriting, entity resolution, and so forth, may be applied to generate a search query that is in more suitable form for submission to various sources. In the ongoing example, the message "How old is President Obama" appears well-suited for use as a search query, and in fact would likely produce a direct answer (e.g., from information engine 130). Moreover, there would likely be a number of search results that relate to or can be related to President Obama's age, such as an encyclopedia page about him, an online biography, an online factsheet, and so forth.

At block 514, the system may obtain content responsive to the search query, e.g., by submitting the search query to various components of knowledge system 102 and receiving content in response. As should be clear from the present disclosure, the term "search query" is not limited to a deliberately typed question or statement from a user to some sort of search engine that is meant to return responsive documents. Rather, the term "search query" more broadly means any information that may be submitted to one or more components of knowledge system 102 to yield responsive content. As noted above, these components may include indexing engine 126, information engine 130, and alternative query suggestion engine 136, to name a few. In some implementations, a message may be used to generate multiple search queries, each tailored towards a different component of knowledge system 102, e.g., to improve the quality of responsive content.

Referring back to FIG. 5, at block 516, the system may incorporate at least a subset of the content returned in response to the search query into the message exchange thread. As noted above, various components of either a client device 106 or knowledge system 102 may perform this operation. For example, message exchange engine 120 and/or personal assistant engine 122 may request that one or more message exchange clients 107 insert responsive content into transcripts visually rendered by each message exchange client 107. Additionally or alternatively, responsive content may be provided by one or more components of knowledge system 102 to message exchange clients 107, and it may be up to the message exchange clients 107 to select (i.e. cull) the responsive content that will be incorporated into the message exchange thread. And in some implementations, the incorporated content may take the form of audible content "spoken" by a personal assistant module to a participant. In the ongoing example, a statement such as "Barack Obama is XX years old" may be incorporated into the message exchange thread.

Figure 6:
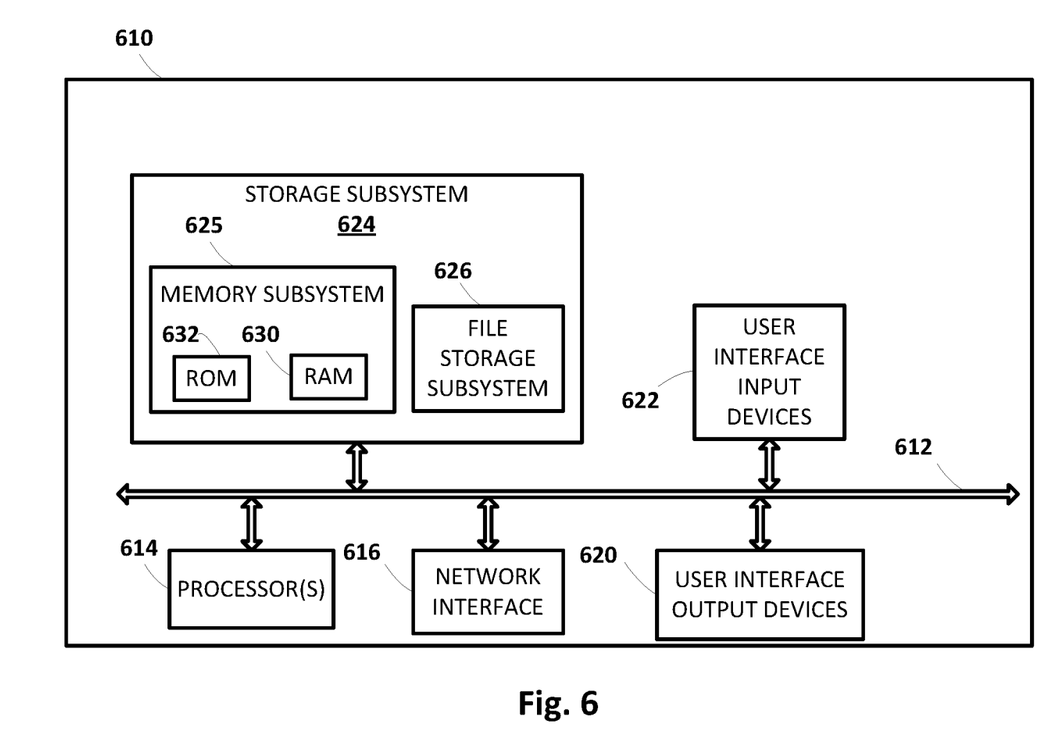
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more of message exchange client 107, personal assistant module 109, message exchange engine 120, personal assistant engine 122, indexing engine 126, information engine 130, ranking engine 134, and/or alternative query suggestion engine 136.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

determining, from a message exchange thread involving one or more message exchange clients, a message contributed to the message exchange thread by a participant, wherein the message is directed by the participant to a personal assistant module participating in the message exchange thread as part of a conversation between the participant and the personal assistant module:

analyzing the message;

based on the analyzing:

calculating, an idle chatter score associated with the message, wherein the idle chatter score represents a similarity between the message and previous conversational content known to be idle chatter;

calculating a search query suitability score associated with the message, wherein the search query suitability score represents a similarity between the message and previous messages that were directed to personal assistant modules in order to cause the personal assistant modules to conduct searches;

comparing the idle chatter score with the search query suitability score;

based on the comparing, selecting, as new content to be incorporated into the message exchange thread by the personal assistant module as a response to the message, either a conversational response to the message or content responsive to a search query generated based on the message; and incorporating, as a message from the personal assistant module, the new content into the message exchange thread.

2. The computer-implemented method of claim 1, wherein the incorporating comprises inserting the response into a transcript of the message exchange thread that is displayed in a graphical user interface of a message exchange client operating on a given client computing device.

3. The computer-implemented method of claim 1, wherein calculating the idle chatter score comprises providing the message as input to a machine learning model, wherein the machine learning model provides, as output, the idle chatter score.

4. The computer-implemented method of claim 3, wherein the machine learning model further provides, as output, the search query suitability score associated with the message.

5. The computer-implemented method of claim 3, wherein the machine learning model is trained on at least one positive training example, wherein the at least one positive training example includes an instance in which one or more participants of a prior message exchange thread responded positively to incorporation of a conversational response to a prior message of the prior message exchange thread or incorporation of content responsive to a prior search query generated based on the prior message.

6. The computer-implemented method of claim 1, further comprising calculating, by one or more of the processors, a search results score associated with the content responsive to the search query, wherein the incorporating is further based on the search results score.

7. The computer-implemented method of claim 6, wherein the search results score is based at least in part on presence of one or more surfaced search results that are responsive to the search query.

8. The computer-implanted method of claim 1, wherein the search query suitability score is further calculated based at least in part on one or more known entities or entity types mentioned in the message.

9. A system comprising one or more processors and memory operably coupled with the one or more processors, wherein the memory stores instructions that, in response to execution of the one or more processors, cause the one or more processors to:
   determine, from a message exchange thread involving one or more message exchange clients, a message contributed to the message exchange thread by a participant, wherein the message is directed by the participant to a personal assistant module participating in the message exchange thread as part of a conversation between the participant and the personal assistant module;
   analyze the message;
   based on the analyzing:
      calculate, an idle chatter score associated with the message, wherein the idle chatter score represents a similarity between the message and previous conversational content known to be idle chatter;
      calculate a search query suitability score associated with the message, wherein the search query suitability score represents a similarity between the message and previous messages that were directed to personal assistant modules in order to cause the personal assistant modules to conduct searches;
   perform a comparison of the idle chatter score with the search query suitability score;
   based on the comparison, select, as new content to be incorporated into the message exchange thread by the personal assistant module as a response to the message, either a conversational response to the message or content responsive to a search query generated based on the message; and
   incorporate, as a message from the personal assistant module, the new content into the message exchange thread.

10. The system of claim 9, wherein the incorporating comprises inserting the graphical element into a transcript of the message exchange thread that is displayed in a graphical user interface of one or more of the message exchange clients.

11. The system of claim 9, wherein the idle chatter score is calculated by providing the message as input to a machine learning model, wherein the machine learning model provides, as output, the idle chatter score.

12. The system of claim 11, wherein the machine learning model is trained on at least one positive training example, wherein the at least one positive training example includes an instance in which one or more participants of a prior message exchange thread responded positively to incorporation of a conversational response to a prior message of the prior message exchange thread.

13. At least one non-transitory computer-readable medium comprising instructions that, in response to execution of the instructions by a computing system, cause the computing system to perform the following operations:
   determining, from a message exchange thread involving one or more message exchange clients, a message contributed to the message exchange thread by a participant, wherein the message is directed by the participant to a personal assistant module participating in the message exchange thread as part of a conversation between the participant and the personal assistant module;
   analyzing the message;
   based on the analyzing:
      calculating, an idle chatter score associated with the message, wherein the idle chatter score represents a similarity between the message and previous conversational content known to be idle chatter;
      calculating a search query suitability score associated with the message, wherein the search query suitability score represents a similarity between the message and previous messages that were directed to personal assistant modules in order to cause the personal assistant modules to conduct searches;
   comparing the idle chatter score with the search query suitability score;
   based on the comparing, selecting, as new content to be incorporated into the message exchange thread by the personal assistant module as a response to the message, either a conversational response to the message or content responsive to a search query generated based on the message; and
   incorporating, as a message from the personal assistant module, the new content into the message exchange thread.

14. The at least one non-transitory computer-readable medium of claim 13, wherein the incorporating comprises inserting the graphical element into a transcript of the message exchange thread that is displayed in a graphical user interface of one or more of the message exchange clients.

15. The system of claim 9, further comprising instructions to calculate a search results score associated with the content responsive to the search query, wherein the selecting is further based on the search results score.

16. The system of claim 15, wherein the search results score is based at least in part on presence of one or more surfaced search results that are responsive to the search query.

17. The system of claim 9, wherein the search query suitability score is further calculated based at least in part on one or more known entities or entity types mentioned in the message.

18. The at least one non-transitory computer-readable medium of claim 13, further comprising instructions to calculate a search results score associated with the content responsive to the search query, wherein the selecting is further based on the search results score.

* * * * *